(12) United States Patent
Kowalk

(10) Patent No.: US 10,289,217 B2
(45) Date of Patent: May 14, 2019

(54) MULTI-FUNCTION CONTROL KNOBS FOR MULTIMEDIA SYSTEMS OF VEHICLES

(71) Applicant: Toyota Motor Engineering & Manufacturing North America, Inc., Erlanger, KY (US)

(72) Inventor: Christopher L. Kowalk, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 38 days.

(21) Appl. No.: 15/209,131

(22) Filed: Jul. 13, 2016

(65) Prior Publication Data

US 2018/0018027 A1 Jan. 18, 2018

(51) Int. Cl.
*G06F 3/0362* (2013.01)
*B60R 11/00* (2006.01)
*G06F 3/01* (2006.01)

(52) U.S. Cl.
CPC ............ *G06F 3/0362* (2013.01); *B60R 11/00* (2013.01); *G06F 3/016* (2013.01)

(58) Field of Classification Search
CPC ......... H03K 17/94; G06F 3/02; G06F 3/0234; G06F 3/0312; G06F 3/0362; H01H 25/04; H01H 19/001; H01H 2003/028; H01H 3/04; H01H 3/06; H01H 3/08; H01H 3/12; H01H 13/64; H01H 19/54; H01H 2021/225; H01H 25/008; H01H 25/06
USPC .................................................. 345/173, 145
See application file for complete search history.

(56) References Cited

U.S. PATENT DOCUMENTS

| | | | |
|---|---|---|---|
| 1,871,876 A | 8/1932 | Brehany | |
| 2,916,617 A | 12/1959 | Mladek | |
| 3,177,432 A | 4/1965 | Kelln | |
| 6,201,471 B1 | 3/2001 | Jones | |
| 6,961,644 B2 | 11/2005 | Mercier et al. | |
| 8,264,338 B2 | 9/2012 | Leon | |
| 8,581,718 B2 | 11/2013 | Muller et al. | |
| 8,665,245 B2 | 3/2014 | Pryor | |
| 2004/0117084 A1* | 6/2004 | Mercier ................. | B60K 37/06 701/36 |

(Continued)

*Primary Examiner* — Vinh T Lam
(74) *Attorney, Agent, or Firm* — Dinsmore & Shohl LLP

(57) ABSTRACT

A multimedia system for a vehicle is provided. The multimedia system includes a processor and a multi-function control knob communicatively coupled to the processor. The multi-function control knob is configured to provide control signals to the processor such that the multi-function control knob operates in a first mode or a second mode and switch between the first mode and the second mode in response to a double actuation of the multi-function control knob. The multi-function control knob sends a first control signal to the processor in response to a single actuation of the multi-function control knob while operating in the first mode, sends a second control signal to the processor in response to a single actuation of the multi-function control knob while operating in the second mode, sends a third control signal to the processor in response to a rotation of the multi-function control knob while operating in the first mode, and sends a fourth control signal to the processor in response to a rotation of the multi-function control knob while operating in the second mode.

15 Claims, 3 Drawing Sheets

(56) References Cited

U.S. PATENT DOCUMENTS

| | | |
|---|---|---|
| 2008/0249682 A1 | 10/2008 | Wisniewski et al. |
| 2008/0257701 A1* | 10/2008 | Wlotzka .............. H01H 25/008 200/336 |
| 2009/0115730 A1* | 5/2009 | Kim ........................ G06F 3/018 345/168 |
| 2010/0060586 A1* | 3/2010 | Pisula ................. G06F 3/04886 345/169 |
| 2010/0225587 A1* | 9/2010 | Harada ................. G06F 3/0233 345/168 |
| 2016/0021456 A1* | 1/2016 | Vansickle ................ H03G 3/02 381/123 |
| 2016/0144716 A1* | 5/2016 | Kim ........................ B60K 35/00 345/184 |
| 2017/0144546 A1* | 5/2017 | Bouaziz ................ B60K 37/06 |

* cited by examiner

MULTI-FUNCTION CONTROL KNOBS FOR MULTIMEDIA SYSTEMS OF VEHICLES

TECHNICAL FIELD

The present specification generally relates to multi-function control knobs for multimedia systems of vehicles and, more specifically, to a multi-function control knob for an audio faceplate of a vehicle that operates in multiple modes.

BACKGROUND

Vehicles often include an audio faceplate on a front dashboard inside the vehicles so that a driver or a passenger on the front passenger seat can operate the audio faceplate. The audio faceplate for vehicles includes various buttons, knobs, switches for manipulating multimedia system of the vehicle. Various structures and designs exist for the audio faceplates, and more functions are being added to the audio faceplate as the vehicle-related technology, e.g., smart car technology, is being developed. Thus, the design of the audio faceplate becomes more complicated and the cost of manufacturing the audio faceplate increases.

Accordingly, a need exists for design of the audio faceplate that is user operation friendly and less expensive to manufacture.

SUMMARY

In one embodiment, a multimedia system for a vehicle is provided. The multimedia system includes a processor and a multi-function control knob communicatively coupled to the processor and configured to provide control signals to the processor such that the multi-function control knob operates in a first mode or a second mode and switch between the first mode and the second mode in response to a double actuation of the multi-function control knob. The multi-function control knob sends a first control signal to the processor in response to a single actuation of the multi-function control knob while operating in the first mode, sends a second control signal to the processor in response to a single actuation of the multi-function control knob while operating in the second mode, sends a third control signal to the processor in response to a rotation of the multi-function control knob while operating in the first mode, and sends a fourth control signal to the processor in response to a rotation of the multi-function control knob while operating in the second mode. The first control signal and the second control signal are different signals for controlling different multimedia operations.

According to another embodiment, another multimedia system for a vehicle is provided. The multimedia system includes a processor and a multi-function control knob communicatively coupled to the processor and configured to provide control signals to the processor such that the multi-function control knob operate in a first mode or a second mode and switch between the first mode and the second mode in response to a predetermined period of continuous actuation of the multi-function control knob. The multi-function control knob sends a first control signal to the processor in response to a single actuation of the multi-function control knob while operating in the first mode, sends a second control signal to the processor in response to a single actuation of the multi-function control knob while operating in the second mode, sends a third control signal to the processor in response to a rotation of the multi-function control knob while operating in the first mode, and sends a fourth control signal to the processor in response to a rotation of the multi-function control knob while operating in the second mode.

In embodiments, the double actuation may be a double press or double touch on the multi-function control knob and the single actuation may be a single press or single touch on the multi-function control knob. The multi-function control knob may be positioned on an audio faceplate of the vehicle or positioned proximate to a transmission shift of the vehicle. The first mode may be a volume control mode and the second mode may be a tune control mode. The first control signal may be a signal for powering on or off a radio of the vehicle. The second control signal may be a signal for selecting a radio station. The third control signal may be a signal for controlling a volume of the multimedia system. The fourth control signal may be a signal for turning radio for the multimedia system.

In embodiments, the multi-function control knob may include mode identification related to a mode of the multi-function control knob. The multi-function control knob may provide a tactile response when the multi-function control knob switches between the first mode and the second mode. The multi-function control knob may provide an audio response when the multi-function control knob switches between the first mode and the second mode.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to a multi-function control knob for a multimedia system in a vehicle. The multi-function control knob operates in two or more modes. When the multi-function control knob is double-pressed or double-touched, the multi-function control knob is switched from one mode to another mode, e.g., a volume control mode to a radio tune control mode. When the multi-function control knob is in the volume control mode, a single-press or a single-touch on the multi-function control knob may send a signal for controlling power (i.e., powering on or off) of the multimedia system. When the multi-function control knob is in the radio tune control mode, a single-press or a single-touch on the multi-function control knob may send a signal for selecting a radio station. Various embodiments of the multi-function control knob for the multimedia system in the vehicle will be described in further detail herein with specific reference to the appended drawings.

Vehicles have a dashboard which may include an instrument cluster arrangement, an audio faceplate, and a heat, ventilation, an air conditioning (HVAC) controller. The instrument cluster arrangement may be located in front of a driver's seat and includes one or more gauges for displaying vehicle metric information. The audio faceplate and the HVAC controller may be located on the center of the dashboard.

Figure 1:
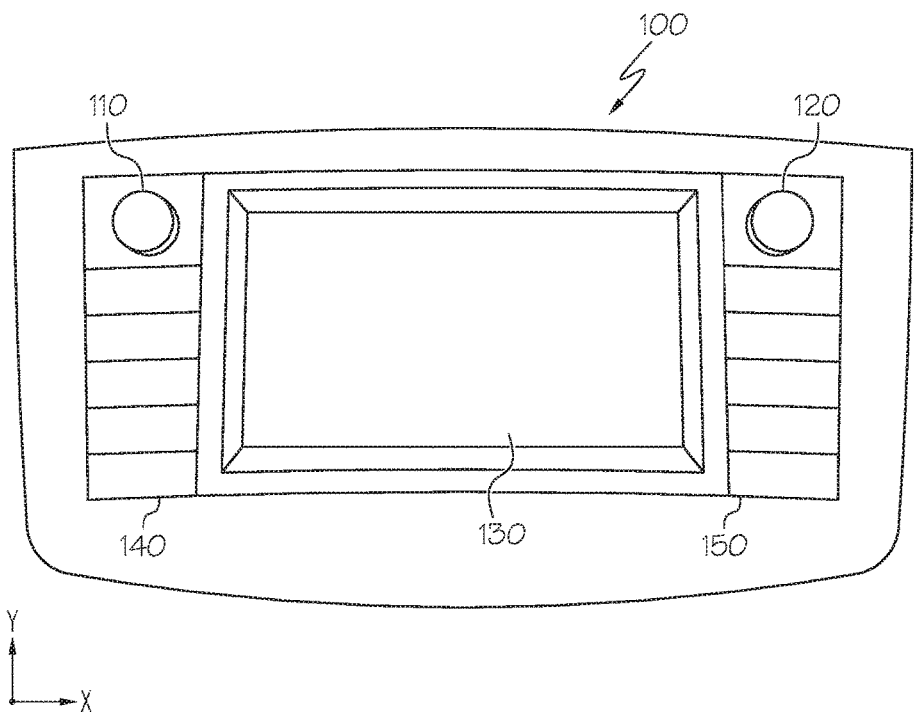
FIG. 1 schematically depicts an example of an audio faceplate system for a vehicle.

FIG. 1 schematically depicts an example of an audio faceplate system for a vehicle. The audio faceplate system 100 may include a first knob 110, a second knob 120, a display screen 130, first input hardware 140, and second input hardware 150. The audio faceplate system 100 may be located between a driver's seat and a front passenger seat so that either the driver or the passenger on the passenger seat can manipulate the audio faceplate. The first knob 110 and the second knob 120 may be a volume control knob and a radio tune control knob, respectively. The display screen 130 may be a screen that displays information on the radio, media, navigation, or any other information. The first input hardware 140 and the second input hardware 150 may include a plurality of buttons and/or switches for a user to manipulate the audio including, but not limited to, a reset button, a power button, a menu/audio button, a band/play/pause button, a mode select button, a tuning/track-down button, a woofer control button, an eject button, a tuning/track-up button, a navigation control button, an equalizer button, and a tilt/video button.

With a driver seating in the vehicle and positioned on the left or driver side (i.e., in the direction of negative x axis) of the audio faceplate system 100, the second knob 120 may be located relatively farther from the driver than the first knob 110. Thus, reaching out to the second knob 120 and manipulating the second knob 120 may distract the driver more than reaching out to the first knob 110. However, it may be necessary for the driver to access both the first knob 110 and the second knob 120 as they each perform a different function.

Figure 2:
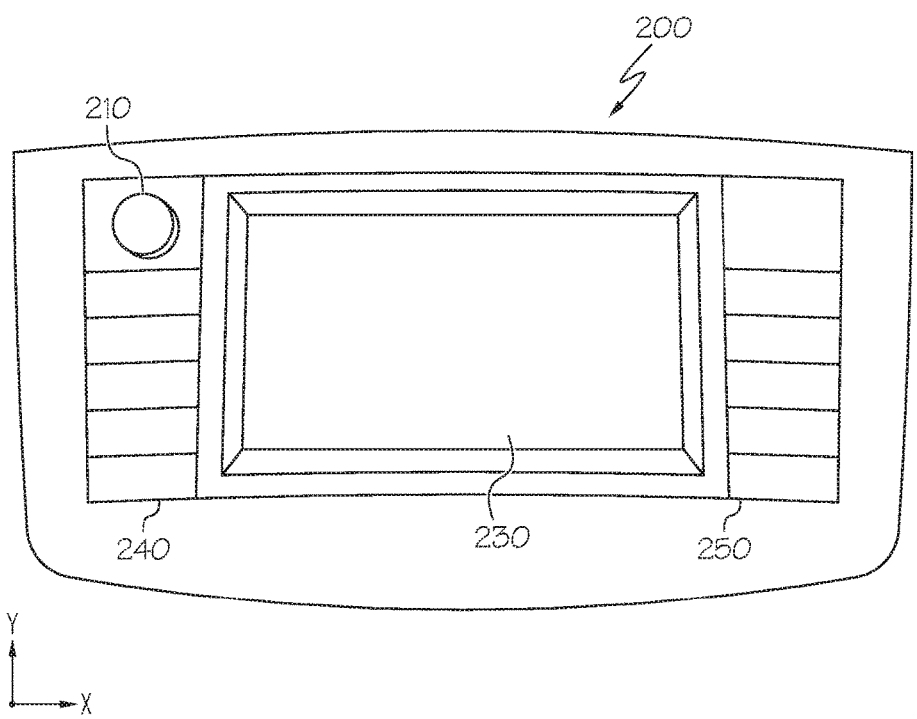
FIG. 2 schematically depicts an audio faceplate system for a vehicle according to one or more embodiments shown and described herein.

FIG. 2 schematically depicts an audio faceplate system for a vehicle according to one or more embodiments shown and described herein. The audio faceplate system 200 may include a multi-function control knob 210, a display screen 230, first input hardware 240, and second input hardware 250. In one embodiment, instead of having two or more knobs, the single multi-function control knob 210 may be included in the audio faceplate system 200. In other embodiments, the multi-function control knob 210 may be used with other knobs. The first input hardware 240 and the second input hardware 250 may include a plurality of buttons for a user to manipulate the audio including, but not limited to, a reset button, a power button, a menu/audio button, a band/play/pause button, a mode select button, a tuning/track-down button, a woofer control button, an eject button, a tuning/track-up button, a navigation control button, an equalizer button, and a tilt/video button.

The multi-function control knob 210 may be a physical knob that can be a manually actuated button that can be pressed upon or an animated control knob displayed on a screen that can be touched upon. In addition, the multi-function control knob 210 (e.g., the display screen 230) may be configured to rotate around a center of the multi-function control knob 210 to send an analog or digital scale input. Although the multi-function control knob 210 is positioned on the left side (i.e., in the direction of negative x axis) of the audio faceplate system 200, the multi-function control knob may be positioned at any other suitable locations such as on the right side (i.e., in the direction of positive x axis) of the audio faceplate system 200 when a driver's seat is located on the right side of the audio faceplate system 200 and/or in the center (e.g., at the top or bottom of the display screen 230).

The multi-function control knob 210 may operate in multiple modes, for example, a volume control mode (e.g., volume control for a multimedia such as a radio, CD, MP3, DVD, etc.) and a radio tune control mode such that it can implement all the functions of both the first knob 110 and the second knob 120 illustrated in FIG. 1 combined. In one embodiment, the multi-function control knob 210 may operate in the volume control mode in default. When the multi-function control knob 210 is single pressed, a power for the multimedia system of the vehicle is on. The volume of the multimedia system is adjusted based on the rotation of the multi-function control knob 210 with the multi-function control knob 210 in the default volume control mode. The volume of the multimedia system may be adjusted based on rotation of the multi-function control knob 210 without changing radio stations.

When the multi-function control knob 210 is double pressed or double touched, the operation mode of the multi-function control knob 210 may be switched to a radio tune control mode from the volume control mode. The double press or touch means two consecutive presses or two consecutive touches having an interval of predetermined time in between, for example, 0.5 second or 1 second. The radio may be tuned from one radio station to another based on the rotation of the multi-function control knob 210 with the multi-function control knob 210 in the radio tune control mode. The tuning of the radio may be adjusted based on rotation of the multi-function control knob 210 without changing volume. When the multi-function control knob 210 is double pressed or double touched again, the mode of the multi-function control knob 210 switches back to the volume control mode as described above. Although the volume control mode and the radio tune control mode are described in association with the multi-function control knob 210, the multi-function control knob 210 may operate in any other modes including, but not limited to, a sound-effect control mode, a menu selecting mode, a media playing mode, a GPS navigation mode, a wiper control mode, a headlight control mode, heat, a ventilation and air conditioning (HVAC) control mode, an in-vehicle light control mode, a camera mode, etc.

In some embodiments, the multi-function control knob 210 may switch between two modes in response to a press and hold of the multi-function control knob 210 for a predetermined period of time. For example, the mode of the multi-function control knob 210 may switch from a volume control mode to a radio tune control mode in response to a press and hold of the multi-function control knob 210 for one or more seconds. Similarly, when the multi-function control knob 210 is in a radio turn control mode, the mode of the multi-function control knob 210 may switch back to the volume control mode in response to the press and hold of the multi-function control knob 210.

In some embodiments, the multi-function control knob 210 may operate in more than two modes. For example, the multi-function control knob 210 may operate in three modes including a volume control mode, a radio tune control mode, and a HVAC control mode. The multi-function control knob 210 may operate in the volume control mode in default. In response to a double-press or a double-touch of the multi-function control knob, the mode of the multi-function control knob 210 switches from the volume control mode to the radio tune control mode. Then, in response to another double-press or double-touch of the multi-function control knob, the mode of the multi-function control knob 210 switches from the radio tune control mode to a HVAC control mode. With one more double press, the mode of the multi-function control knob 210 switches back to the volume control mode. In some embodiments, the number of modes and the types of modes may be predetermined by a user. For example, the multi-function control knob 210 may be predetermined to operate in two modes including a volume control mode and a radio tune control mode. In another example, the multi-function control knob 210 may be predetermined to operate in four modes including a volume control mode, a radio tune control mode, a menu selection mode, and a headlight control mode. Further details of the operation of the multi-function control knob 210 will be described below with reference to FIG. 4.

When the multi-function control knob 210 is in a sound-effect control mode, the multi-function control knob 210 may operate, for example, similar to a bass control knob or a treble control knob. In some embodiments, the multi-function control knob 210 may operate to select sound-effect modes including, but not limited to, a music mode, a sports mode, a cinema mode, a standard mode, a news mode, etc. Specifically, when the multi-function control knob 210 is in a sound-effect control mode, rotating the multi-function control knob 210 to a certain degree clockwise or counter-clockwise may change the sound-effect mode from one to another, e.g., from a standard mode to a music mode. A single press or a single touch on the multi-function control knob 210 while in the sound-effect control mode may select the current sound mode.

When the multi-function control knob 210 is in a menu selecting mode, rotating the multi-function control knob 210 may allow a user to browse menus displayed on the display screen 230. For example, rotating the multi-function control knob 210 to a certain degree clockwise or counterclockwise instructs a cursor on the display screen 230 to move to a next menu. A single press or a single touch on the multi-function control knob 210 while in the menu selecting mode may select the current menu that the cursor is indicating.

When the multi-function control knob 210 is in a media playing mode, a single press or a single touch on the multi-function control knob 210 may play or stop a current media, e.g., a CD, a DVD, a MP3, a Blu-ray, etc. Rotating the multi-function control knob 210 to a certain degree clockwise or counterclockwise while in the media playing mode may instruct the multimedia system to skip to the next track, or go back to the previous track. Alternatively, rotating may instruct the multimedia system to fast forward or reward the current media.

When the multi-function control knob 210 is in a GPS navigation mode, a single press or a single touch on the multi-function control knob 210 may start or stop GPS navigation such that the display screen 230 initiates or terminates displaying a navigational map. Rotating the multi-function control knob 210 to a certain degree clockwise or counterclockwise while in the GPS navigation mode may instruct the multimedia system to various operations including, but not limited to, enlarging or reducing the map, switching to a different mode of the map, changing the destination, switching to a different mode of the map, etc.

When the multi-function control knob 210 is in a wiper control mode, rotating the multi-function control knob 210 to a certain degree clockwise or counterclockwise may instruct an electrical control unit of the vehicle to change the speed of the wiper. A single press or a single touch on the multi-function control knob 210 while in the wiper control mode may select the current speed of the wiper.

When the multi-function control knob 210 is in a headlight control mode, rotating the multi-function control knob 210 to a certain degree clockwise or counterclockwise may instruct an electrical control unit of the vehicle to change the intensity of the headlight beam. A single press or a single touch on the multi-function control knob 210 while in the headlight control mode may select the current intensity of the headlight beam.

When the multi-function control knob 210 is in a heat, ventilation and air conditioning (HVAC) control mode, rotating the multi-function control knob 210 to a certain degree clockwise or counterclockwise may instruct an electrical control unit of the vehicle to change the target temperature of the air inside the vehicle, or the degree of ventilation of the vehicle. A single press or a single touch on the multi-function control knob 210 while in the HVAC control mode may select the current target temperature or degree of ventilation.

When the multi-function control knob 210 is in an in-vehicle light control mode, rotating the multi-function control knob 210 to a certain degree clockwise or counterclockwise may instruct an electrical control unit of the vehicle to change the intensity of the in-vehicle light. A single press or a single touch on the multi-function control knob 210 while in the in-vehicle light control mode may select the current intensity of the in-vehicle light.

When the multi-function control knob 210 is in a camera mode, rotating the multi-function control knob 210 to a certain degree clockwise or counterclockwise may instruct an electrical control unit of the vehicle to zoom in or zoom out of the camera of the vehicle. A single press or a single touch on the multi-function control knob 210 while in the camera control mode may select the current zoom of the camera.

Figure 3:
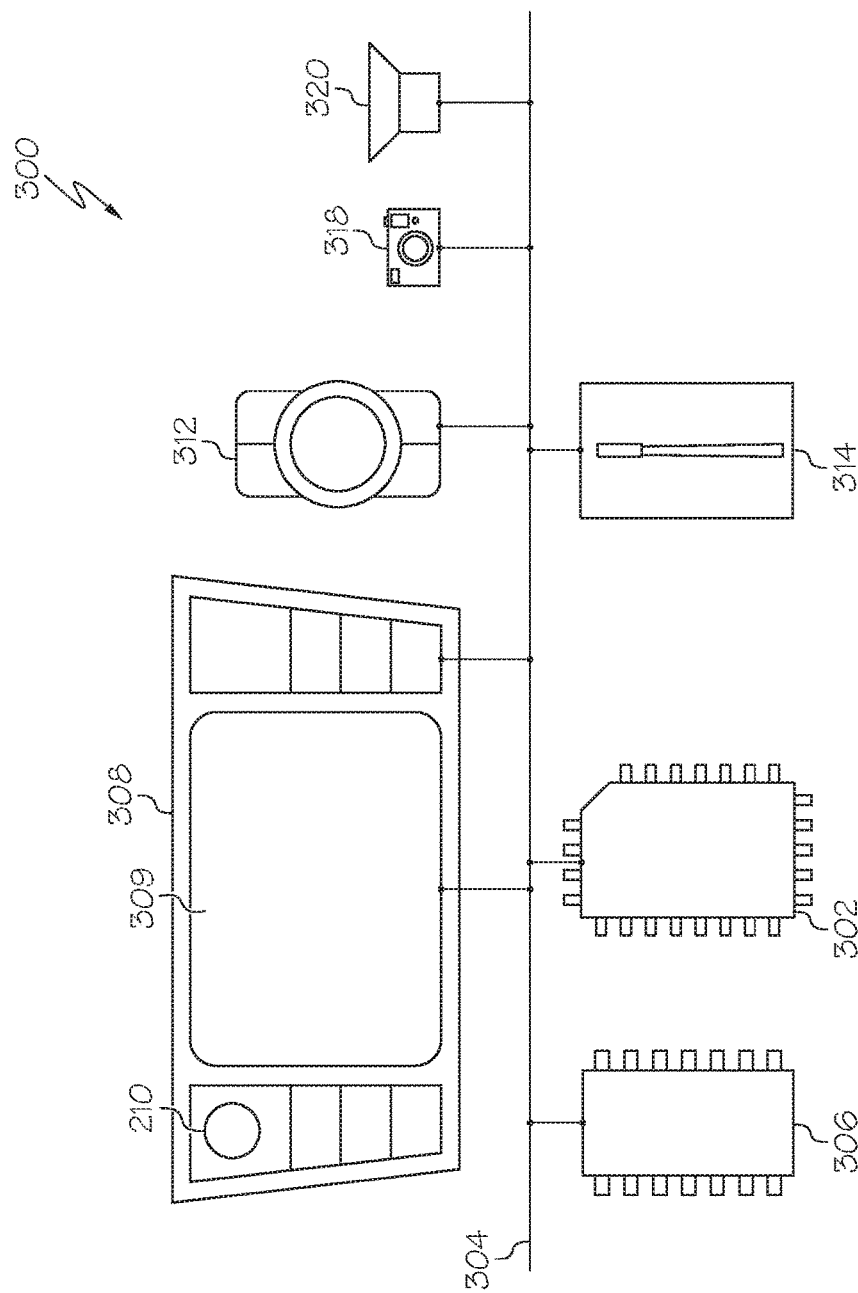
FIG. 3 schematically depicts a multimedia system of a vehicle according to one or more embodiments shown and described herein.

Referring now to FIG. 3, an embodiment of a multimedia system 300 is schematically depicted. It is noted that, while the multimedia system 300 is depicted in isolation, the multimedia system 300 may be included within a vehicle in some embodiments. In embodiments in which the multimedia system 300 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the system may be embedded within a mobile device (e.g., smartphone, laptop computer, etc.) carried by a driver of the vehicle.

The multimedia system 300 includes one or more processors 302. Each of the one or more processors 302 may be any device capable of executing machine readable instructions. Accordingly, each of the one or more processors 302 may be a controller, an integrated circuit, a microchip, a computer, or any other computing device. The one or more processors 302 are coupled to a communication path 304 that provides signal interconnectivity between various modules of the system. Accordingly, the communication path 304 may communicatively couple any number of processors 302 with one another, and allow the modules coupled to the communication path 304 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 304 may be formed from any medium that is capable of transmitting a signal such as, for example, conductive wires, conductive traces, optical waveguides, or the like. In some embodiments, the communication path 304 may facilitate the transmission of wireless signals, such as WiFi, Bluetooth, and the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Accordingly, the communication path 304 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The multimedia system 300 includes one or more memory modules 306 coupled to the communication path 304. The one or more memory modules 306 may comprise RAM, ROM, flash memories, hard drives, or any device capable of storing machine readable instructions such that the machine readable instructions can be accessed by the one or more processors 302. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 306 may include a database that includes navigation information and/or map information.

Referring still to FIG. 3, the multimedia system 300 comprises an audio faceplate 308 that includes a display screen 309 and the multi-function control knob 210. The display screen 309 provides visual output such as, for example, maps, navigation, entertainment, media, or a combination thereof. The display screen 309 is coupled to the communication path 304. Accordingly, the communication path 304 communicatively couples the display screen 309 to other modules of the multimedia system 300. The display screen 309 may include any medium capable of transmitting an optical output such as, for example, a cathode ray tube, light emitting diodes, a liquid crystal display, a plasma display, or the like. Moreover, the display screen 309 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display screen 309 can include at least one of the one or more processors 302 and the one or memory modules 306. While the multimedia system 300 includes a display screen 309 in the embodiment depicted in FIG. 3, the multimedia system 300 may not include a display screen 309 in other embodiments.

The multi-function control knob 210 is coupled to the communication path 304 such that the communication path 304 communicatively couples the multi-function control knob 210 to other modules of the multimedia system 300. The multi-function control knob 210 may be any device capable of transforming mechanical, optical, or electrical signals into a data signal capable of being transmitted with the communication path 304. Specifically, the multi-function control knob 210 may include any number of movable objects that each transform physical motion into a data signal that can be transmitted to over the communication path 304 such as, for example, a button, a switch, a microphone or the like. In some embodiments, the display screen 309 and the multi-function control knob 210 are combined as a single module and operate as an audio head unit or an infotainment system. However, it is noted, that the display screen 309 and the multi-function control knob 210 may be separate from one another and operate as a single module by exchanging signals via the communication path 304.

The multimedia system 300 optionally comprises a peripheral tactile input 312 coupled to the communication path 304 such that the communication path 304 communicatively couples the peripheral tactile input 312 to other modules of the multimedia system 300. For example, in one embodiment, the peripheral tactile input 312 is located in a vehicle console to provide an additional location for receiving input. The peripheral tactile input 312 operates in a manner substantially similar to the multi-function control knob 210, i.e., the peripheral tactile input 312 includes movable objects and transforms motion of the movable objects into a data signal that may be transmitted over the communication path 304. For example, the peripheral tactile input 312 may be located close to a transmission gear so that a driver can easily manipulate the peripheral tactile input 312.

The multimedia system 300 comprises a satellite antenna 314 coupled to the communication path 304 such that the communication path 304 communicatively couples the satellite antenna 314 to other modules of the multimedia system 300. The satellite antenna 314 is configured to receive signals from global positioning system satellites. Specifically, in one embodiment, the satellite antenna 314 includes one or more conductive elements that interact with electromagnetic signals transmitted by global positioning system satellites. The received signal is transformed into a data signal indicative of the location (e.g., latitude and longitude) of the satellite antenna 314 or an object positioned near the satellite antenna 314, by the one or more processors 302. Additionally, it is noted that the satellite antenna 314 may include at least one of the one or more processors 302 and the one or memory modules 306. In some embodiments, the multimedia system 300 does not include the satellite antenna 314.

Still referring to FIG. 3, the multimedia system 300 may further comprise a camera 318 coupled to the communication path 304 such that the communication path 304 communicatively couples the camera 318 to other modules of the multimedia system 300. The camera 318 may be any device having an array of sensing devices (e.g., pixels) capable of detecting radiation in an ultraviolet wavelength band, a visible light wavelength band, or an infrared wavelength band. The camera 318 may have any resolution. Suitable cameras may include, for example, a video camera, charge coupled device (CCD) camera, complementary metal-oxide-semiconductor (CMOS) camera, etc. Some embodiments may not include the camera 318. Some embodiments may include multiple cameras 318. The camera 318 may be able to detect a target object within a vicinity of the multimedia system 300. Further, the camera 318 may be able to determine one or more characteristics about the target object, such as, for example, the speed and direction of travel of the target object. In further embodiments, the camera 318 and/or the processors 302, based on input from the camera 318, may be able to determine the type of object the camera 318 is capturing through image recognition capabilities. For example, the camera 318 and/or the one or more processors 302 may be able to determine whether the target object is another vehicle, a cyclist, a pedestrian, an animal, and/or a structure.

Still referring to FIG. 3, the multimedia system 300 may further comprise a speaker 320 coupled to the communication path 304 such that the communication path 304 communicatively couples the speaker 320 to other modules of the multimedia system 300. The speaker 320 transforms data signals from the multimedia system 300 into audible mechanical vibrations.

Still referring to FIG. 3, the multimedia system 300 can be formed from a plurality of modular units, i.e., the audio faceplate 308, the multi-function control knob 210, the peripheral tactile input 312, and satellite antenna 314, can be formed as modules communicatively coupled form the multimedia system 300. Accordingly, in some embodiments, each of the modules can include at least one of the one or more processors 302 and/or the one or more memory modules 306. Accordingly, it is noted that, while specific modules may be described herein as including a processor 302 and/or a memory module 306, the embodiments described herein can be implemented with the processors 302 and memory modules 306 distributed throughout various communicatively coupled modules.

Figure 4:
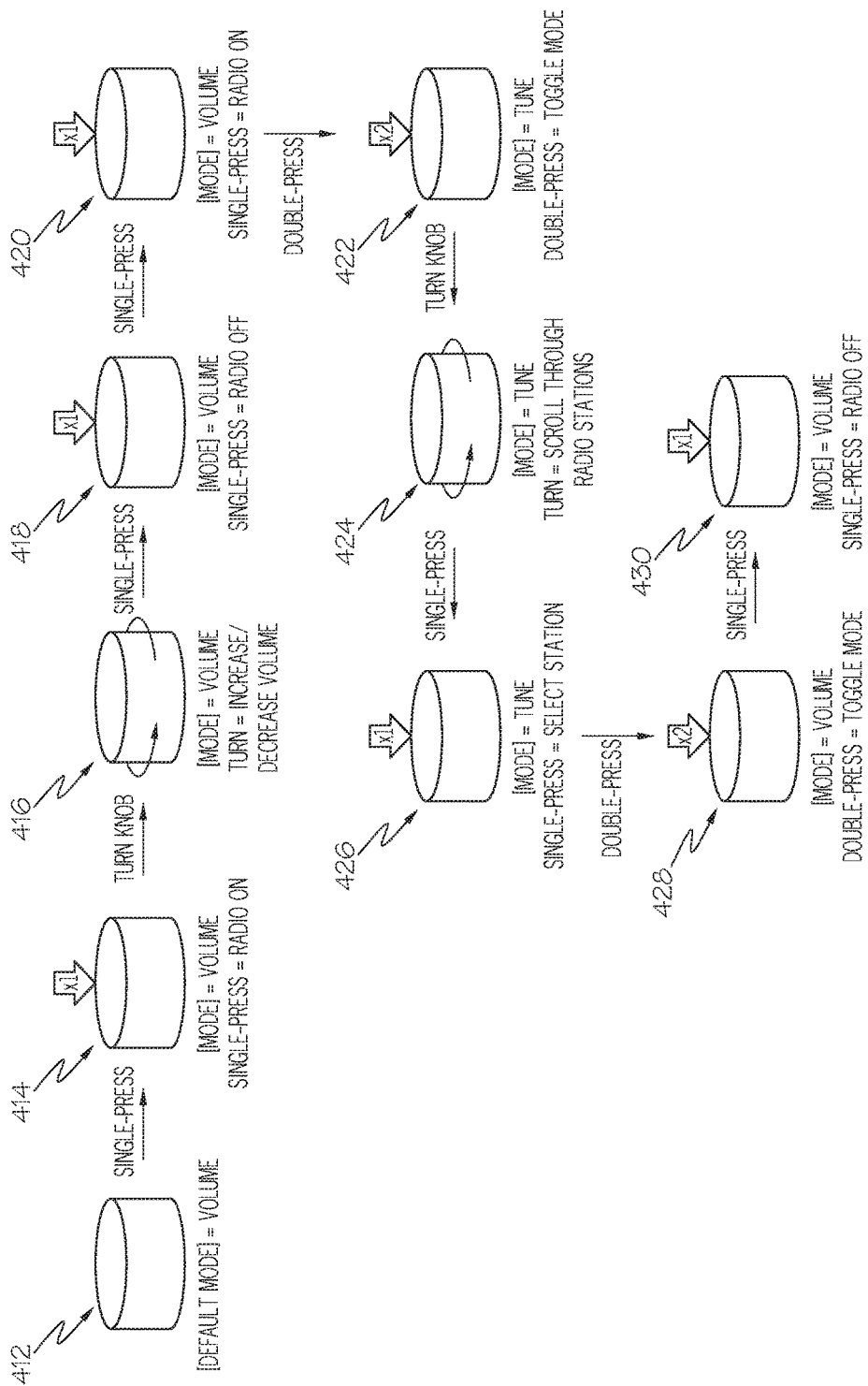
FIG. 4 schematically depicts a flow chart of operating a multi-function control knob in multiple modes according to one or more embodiments.

FIG. 4 schematically depicts a flow chart of operating a multi-function control knob in multiple modes according to one or more embodiments. The multi-function control knob depicted in FIG. 4 may correspond to the multi-function control knob 210 in FIG. 2, or the multi-function control knob 210 in FIG. 3. In step 412, the multi-function control knob operates in a volume control mode as a default mode. In step 414, the multi-function control knob may be single-pressed or single-touched by a user. When the multi-function control knob is single-pressed or single-touched, the multi-function control knob sends a signal for powering on the multimedia system 300 of the vehicle, and the multimedia system 300 of the vehicle is powered on. For example, the radio of the vehicle is powered on, or a media player such as a CD player or an MP3 player of the vehicle is powered on. The multi-function control knob still operates in the volume control mode.

In step 416, the multi-function control knob may be rotated by the user clockwise or counterclockwise. In response to the rotation, the multi-function control knob 210 sends a volume control signal to the processor 302 of the multimedia system 300, and the volume of the multimedia system 300 is increased or decreased accordingly. The multi-function control knob 210 is still in the volume control mode. In step 418, the multi-function control knob 210 may be single-pressed or single-touched again. Then, the multi-function control knob 210 sends a signal for powering off to the processor 302, and the multimedia system 300 of the vehicle is powered off. The multi-function control knob 210 is still operating in the volume control mode. In step 420, the multi-function control knob 210 may be single-pressed or single-touched again. The multi-function control knob 210 sends a signal for powering on to the processor 302, and the multimedia system 300 of the vehicle is powered on. The multi-function control knob 210 may still operate in the volume control mode, and thus, the user can control the volume of the multimedia system 300 by rotating the multi-function control knob 210.

In step 422, the multi-function control knob 210 may be double-pressed or double-touched. Then, the multi-function control knob 210 sends a signal for changing the mode of the multi-function control knob 210 to the processor 302, and the mode of the multi-function control knob 210 may be switched from the volume control mode to a radio tune control mode. The double-press may be two consecutive presses with an interval of a predetermined time, e.g., between 0.1 second and 1 second. The double-touch may be two consecutive touches with an interval of a predetermined time. The touch may be a touch by a portion of a finger on a touch screen on the audio faceplate 308 or a physical knob.

In some embodiments, the current mode of the multi-function control knob 210 may be saved in the memory module 306 and the processor 302 may determine a signal received from the multi-function control knob 210 based on the current mode of the multi-function control knob 210. Specifically, if the current mode is a volume control mode and the processor 302 receives a signal from the multi-function control knob 210 associated with a single-press on the multi-function control knob 210, the processor may determine that the received signal is a signal for controlling the power of the multi-media system. If the current mode is a radio tune control mode and the processor 302 receives a signal from the multi-function control knob 210 associated with a single-press on the multi-function control knob 210, the processor may determine that the received signal is a signal for selecting a current radio station. Similarly, if the current mode is a volume control mode and the processor 302 receives a signal from the multi-function control knob 210 associated with a rotation of the multi-function control knob 210, the processor may determine that the received signal is a signal for adjusting the volume of the multi-media system. If the current mode is a radio tune control mode and the processor 302 receives a signal from the multi-function control knob 210 associated with a rotation of the multi-function control knob 210, the processor may determine that the received signal is a signal for changing a radio station from one to another.

In some embodiments, when the mode of the multi-function control knob 210 changes, the indication of the mode change may be provided to the user by audio feedback. For example, the multimedia system 300 may generate a first sound when the mode is switched from the volume control mode to the radio tune control mode and generate a second sound when the mode is switched from the radio tune control mode to the volume control mode. Specifically, the first sound may be an electronically simulated sound of saying "volume" and the second sound may be an electronically simulated sound of saying "tune." In some embodiments, when the mode of the multi-function control knob 210 changes, the indication of the mode change may be provided to the user by tactile feedback. For example, the multi-function control knob 210 may include a vibrating element inside, and vibrate in a first pattern when the mode is switched from the volume control mode to the radio tune control mode and vibrate in a second pattern when the mode is switched from the radio tune control mode to the volume control mode.

In step 424, the multi-function control knob 210 may be rotated by the user clockwise or counterclockwise. In response to the rotation, the multi-function control knob 210 sends a tune control signal to the processor 302 of the multimedia system 300, and the radio tune of the multimedia system 300 is adjusted accordingly. In this step, the multi-function control knob 210 is still operating in the radio tune control mode. In step 426, the multi-function control knob 210 may be single-pressed or single-touched. Then, the multi-function control knob 210 sends a signal for selecting a current station that is tuned in to the processor 302 of the multimedia system 300, and the multimedia system 300 may select the current radio station and/or store the current radio station information.

In step 428, the multi-function control knob 210 may be double-pressed or double-touched again. In response, the multi-function control knob 210 sends a signal for changing the mode of the multi-function control knob 210 to the processor 302, and the mode of the multi-function control knob 210 is switched from the radio tune control mode to the volume control mode. Then, the user can control the volume of the multimedia system by rotating the multi-function control knob 210 clockwise or counterclockwise. In step 430, the multi-function control knob 210 is single-pressed or single-touched. Then, the multi-function control knob 210 sends a signal for powering off to the processor 302, and the multimedia system 300 of the vehicle is powered off.

The multi-function control knob according to the present disclosure may replace a plurality of knobs on the audio faceplate. For example, the single multi-function control knob is placed on the audio faceplate instead of placing two separate knobs for a volume control and a tune control. Thus, the design of the audio faceplate may be simplified and the manufacturing cost of the audio faceplate is reduced. In addition, because the multi-function control knob is located relatively close to the driver than other control knobs such as the second knob 120 in FIG. 1, the driver can conveniently manipulate the multi-function control knob with less distraction while driving.

Although the multi-function control knob of the present disclosure is described in association with an audio faceplate for a vehicle, the multi-function control knob may be employed in various electronic devices including, but not limited to, remote controllers, smart phones, table computers, laptop computers, any consumer electronics such as TVs, refrigerators, washers/dryers, etc., thermostats. In addition, in some embodiments, instead of requiring double-press or double-touch for mode changes, triple or more press or touch may be used to change the mode of the multi-function control knob.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multimedia system for a vehicle comprising:
a processor; and
a multi-function control knob communicatively coupled to the processor, the multi-function control knob configured to provide control signals to the processor such that the multi-function control knob
operates in a volume control mode or a radio tune control mode;
switches between the volume control mode and the radio tune control mode in response to a double press of an area of the multi-function control knob in a direction in parallel with a central axis of the multi-function control knob, the double press being made to a same area on the multi-function control knob;
sends a first control signal to the processor in response to a single actuation of the multi-function control knob while operating in the volume control mode;
sends a second control signal to the processor in response to a single actuation of the multi-function control knob while operating in the radio tune control mode, wherein the first control signal and the second control signal are for controlling different multimedia operations;
sends a third control signal to the processor in response to a rotation of the multi-function control knob while operating in the volume control mode; and
sends a fourth control signal to the processor in response to a rotation of the multi-function control knob when operating in the radio tune control mode, wherein the third control signal and the fourth control signal are for controlling different multimedia operations.

2. The multimedia system of claim 1, wherein the single actuation is a single press on the multi-function control knob.

3. The multimedia system of claim 1, wherein the single actuation is a single touch on the multi-function control knob.

4. The multimedia system of claim 1, wherein the multi-function control knob is positioned on an audio faceplate of the vehicle.

5. The multimedia system of claim 1, wherein the multi-function control knob is positioned proximate to a transmission shift of the vehicle.

6. The multimedia system of claim 1, wherein the first control signal is a signal for powering on or off a radio of the vehicle.

7. The multimedia system of claim 1, wherein the second control signal is a signal for selecting a radio station.

8. The multimedia system of claim 1 wherein the third control signal is a signal for controlling a volume of the multimedia system.

9. The multimedia system of claim 1, wherein the fourth control signal is a signal for tuning radio for the multimedia system.

10. The multimedia system of claim 1, wherein the multi-function control knob comprises mode identification related to a mode of the multi-function control knob.

11. The multimedia system of claim 1, wherein the multi-function control knob is configured to provide a tactile response when the multi-function control knob switches between the volume control mode and the radio tune control mode.

12. The multimedia system of claim 1, wherein the multi-function control knob is configured to provide an audio response when the multi-function control knob switches between the volume control mode and the radio tune control mode.

13. The multimedia system of claim 1, wherein the volume control mode is a volume control mode, and the radio tune control mode is one of a sound-effect control mode, a menu selecting mode, a media playing mode, a GPS navigation mode, a wiper control mode, a headlight control mode, heat, a ventilation and air conditioning (HVAC) control mode, an in-vehicle light control mode, and a camera mode.

14. A multimedia system for a vehicle comprising:
a processor; and
a multi-function control knob communicatively coupled to the processor, the multi-function control knob configured to provide control signals to the processor such that the multi-function control knob
 operates in a volume control mode or a radio tune control mode;
 switches from the volume control mode to the radio tune control mode in response to a predetermined period of press and hold of the multi-function control knob in a direction in parallel with a central axis of the multi-function control knob when the multi-function control knob operates in the volume control mode;
 switches from the radio tune control mode to the volume control mode in response to the predetermined period of press and hold of the multi-function control knob in a direction in parallel with a central axis of the multi-function control knob when the multi-function control knob operates in the radio tune control mode;
 sends a first control signal to the processor in response to a single actuation of the multi-function control knob while operating in the volume control mode;
 sends a second control signal to the processor in response to a single actuation of the multi-function control knob while operating in the radio tune control mode, wherein the first control signal and the second control signal are different signals for controlling different multimedia operations;
 sends a third control signal to the processor in response to rotation of the multi-function control knob while operating in the volume control mode; and
 sends a fourth control signal to the processor in response to rotation of the multi-function control knob while operating in the radio tune control mode, wherein the third control signal and the fourth control signal are different signals for controlling different multimedia operations.

15. The multimedia system of claim 14, wherein the multi-function control knob is positioned on a steering wheel of the vehicle.

* * * * *